(12) United States Patent
Chasman et al.

(10) Patent No.: US 7,287,725 B2
(45) Date of Patent: Oct. 30, 2007

(54) MISSILE CONTROL SYSTEM AND METHOD

(75) Inventors: Daniel B. Chasman, Tucson, AZ (US); Michael Leal, Tucson, AZ (US); Stephen D. Haight, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/113,511

(22) Filed: Apr. 25, 2005

(65) Prior Publication Data
US 2006/0284006 A1 Dec. 21, 2006

(51) Int. Cl.
*B64C 1/24* (2006.01)

(52) U.S. Cl. ............... 244/53 R; 244/73 R; 244/3.22; 60/258; 60/764; 239/251; 239/262

(58) Field of Classification Search ............ 244/3.22, 244/3.23, 52, 207, 53 R, 73 R, 74; 60/258–266, 60/251, 761–766; 239/251, 261, 262
See application file for complete search history.

(56) References Cited

U.S. PATENT DOCUMENTS

| | | | |
|---|---|---|---|
| 2,613,497 A | 10/1952 | Macdonald | |
| 2,933,889 A | 4/1960 | Tolkmitt | |
| 3,046,736 A | 7/1962 | Thomsom | |
| 3,052,090 A | 9/1962 | Herzog | |
| 3,097,482 A * | 7/1963 | Lovingham | 60/258 |
| 3,115,747 A * | 12/1963 | Yu | 60/260 |
| 3,115,767 A | 12/1963 | Ying-Nien | |
| 3,147,591 A | 9/1964 | McEwen | |
| 3,420,060 A * | 1/1969 | Toney et al. | 60/264 |
| 3,433,265 A | 3/1969 | Emil | |
| 3,650,348 A | 3/1972 | Colebrook et al. | |
| 3,817,029 A * | 6/1974 | Frisch | 60/263 |
| 4,023,749 A | 5/1977 | McCorkle, Jr. | |

(Continued)

FOREIGN PATENT DOCUMENTS

DE 1 153 657 8/1963

(Continued)

OTHER PUBLICATIONS

International Search Report, Application No. PCT/US03/35237, Filing Date Nov. 3, 2003.

(Continued)

*Primary Examiner*—J. Woodrow Eldred
(74) *Attorney, Agent, or Firm*—Renner, Otto, Boisselle & Sklar, LLP

(57) ABSTRACT

A missile includes a control system having divert and attitude control system thrusters with control valves. Each of the control valves has a nozzle plate having a plurality of small nozzles therein. The nozzle plate includes a pair of portions, one of which is rotatable relative to the other. Control of flow through the nozzle plate may be effected by relative positioning of the portions of the nozzle plate. An upstream convergent portion of the nozzle plate may be fixed relative to the missile, with a downstream throat and/or divergent portion of the nozzle plate moveable. Movement of the movable portion of the nozzle plate may be accomplished by use of an actuator that is external to the missile body. The control valve provides a simple, lightweight and compact way of controlling flow from a divert thruster.

29 Claims, 6 Drawing Sheets

U.S. PATENT DOCUMENTS

| | | | |
|---|---|---|---|
| 4,085,909 A | 4/1978 | East et al. | |
| 4,131,246 A | 12/1978 | Rotmans | |
| 4,163,534 A | 8/1979 | Seeger | |
| 4,432,512 A | 2/1984 | Young | |
| 4,483,139 A * | 11/1984 | Engl | 60/251 |
| 4,745,861 A * | 5/1988 | Fenton et al. | 244/3.22 |
| 4,826,104 A | 5/1989 | Bennett et al. | |
| 4,844,380 A | 7/1989 | Peoples et al. | |
| 4,867,393 A | 9/1989 | Faupell et al. | |
| 4,913,379 A | 4/1990 | Kubota et al. | |
| 5,074,492 A * | 12/1991 | Morgand | 244/3.22 |
| 5,112,007 A * | 5/1992 | Buchele-Buecher | 244/3.22 |
| 5,343,698 A * | 9/1994 | Porter et al. | 60/263 |
| 5,456,425 A | 10/1995 | Morris et al. | |
| 5,505,408 A | 4/1996 | Speicher et al. | |
| 5,511,745 A | 4/1996 | Faupell et al. | |
| 5,662,290 A | 9/1997 | Voigt | |
| 5,887,821 A | 3/1999 | Voigt et al. | |
| 6,142,425 A * | 11/2000 | Armanios et al. | 244/52 |
| 2004/0084566 A1 | 5/2004 | Chasman | |
| 2005/0011989 A1 | 1/2005 | Chasman et al. | |

FOREIGN PATENT DOCUMENTS

| | | |
|---|---|---|
| DE | 37 14 425 | 11/1988 |
| FR | 1 217 708 | 5/1960 |
| GB | 2 092 271 | 8/1982 |
| WO | WO 2004/044519 | 5/2004 |

OTHER PUBLICATIONS

Saturn V Flight Manual AS 506, no date, no author; posted on the internet at www.apollosaturn.com; section entitled "S-IC Stage."

U.S. Appl. No. 10/289,651, filed Nov. 7, 2002, entitled Multi-Nozzle Grid Missile Propulsion System.

U.S. Appl. No. 10/288,943, filed Nov. 6, 2002, entitled Multi-Nozzle Grid Missile Propulsion System.

D.B. Saharon, "Turbulence Effect on Crossflow Around a Circular Cylinder at Subcritical Reynolds Numbers," Master Thesis, Colorado State University, Ft. Collins, Colorado, Mar. 1982.

H. Seifert and M. Summerfield, "Space Technology," H. Siefert ed. pp. 14-26, N.Y., John Wiley and Sons, Inc. 1959.

S. Chasman, "Characteristic Gap: A New Design Criterion for Solid Rocket Motors." Technical Note, Journal of Propulsion, vol. 17, No. 1, pp. 216-218, Washington DC, Mar. 2000.

E. Oberg, F.D. Jones, and H.L. Horton, "Machinery's Handbook," 23rd Edition, p. 66.

* cited by examiner

MISSILE CONTROL SYSTEM AND METHOD

BACKGROUND OF THE INVENTION

1. Technical Field of the Invention

The invention relates to missile systems, and in particular to control systems for missiles and rocket engines.

2. Background of the Related Art

Throttling control valves, such as used for divert thrusters for rockets and missiles, have typically involved a pintle that can be moved into and out of a convergent portion of a single convergent-divergent nozzle. Such mechanisms add significant amounts of mass to divert attitude control systems. In addition, the pintle and its corresponding actuation system are generally located internally, where they disadvantageously may be exposed to a high-pressure, high-temperature environment of combustion-product gasses used to produce the thrust.

It will be appreciated from the foregoing that some improvements may be possible for throttling control valves for divert thrusters.

SUMMARY OF THE INVENTION

According to an aspect of the invention, a control valve has a pair of plates, or sections of a plate, which are relatively rotatable. Each of the plates or sections has corresponding openings, which can be lined up to allow flow therethrough, or can be misaligned to allow only partial flow or no flow. The control openings may combine to form plural convergent-divergent nozzles.

According to another aspect of the invention, a rocket engine control valve includes a fixed portion having fixed portion openings therein; and a movable portion having movable portion openings therein. The movable portion overlies the fixed portion. The movable portion is rotatably mounted to the fixed portion. The fixed portion openings and the movable portion openings combine to produce plural nozzles each having a convergent section, a divergent section, and a throat. The fixed portion openings and the movable portion openings line up, allowing flow therethrough, when the movable portion is in an open position relative to the fixed portion. The fixed portion openings and the movable portion openings are offset from one another, preventing flow therethrough, when the movable portion is in a closed position relative to the fixed portion.

According to yet another aspect of the invention, a method of controlling thrust from a rocket engine includes the steps of providing pressurized gas upstream of a control valve; and relatively configuring portions of the control valve, thereby selectively aligning or not aligning plural holes in each of the portions, to thereby control flow through the control valve.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A missile includes a control system having divert and attitude control system thrusters with control valves. Each of the control valves has a nozzle plate having a plurality of small nozzles therein. The nozzle plate includes a pair of portions, one of which is rotatable relative to the other. Control of flow through the nozzle plate may be effected by relative positioning of the portions of the nozzle plate. An upstream convergent portion of the nozzle plate may be fixed relative to the missile, with a downstream throat and/or divergent portion of the nozzle plate moveable. Movement of the movable portion of the nozzle plate may be accomplished by use of an actuator that is external to the missile body. The control valve provides a simple, lightweight and compact way of controlling flow from a divert thruster.

Figure 1:
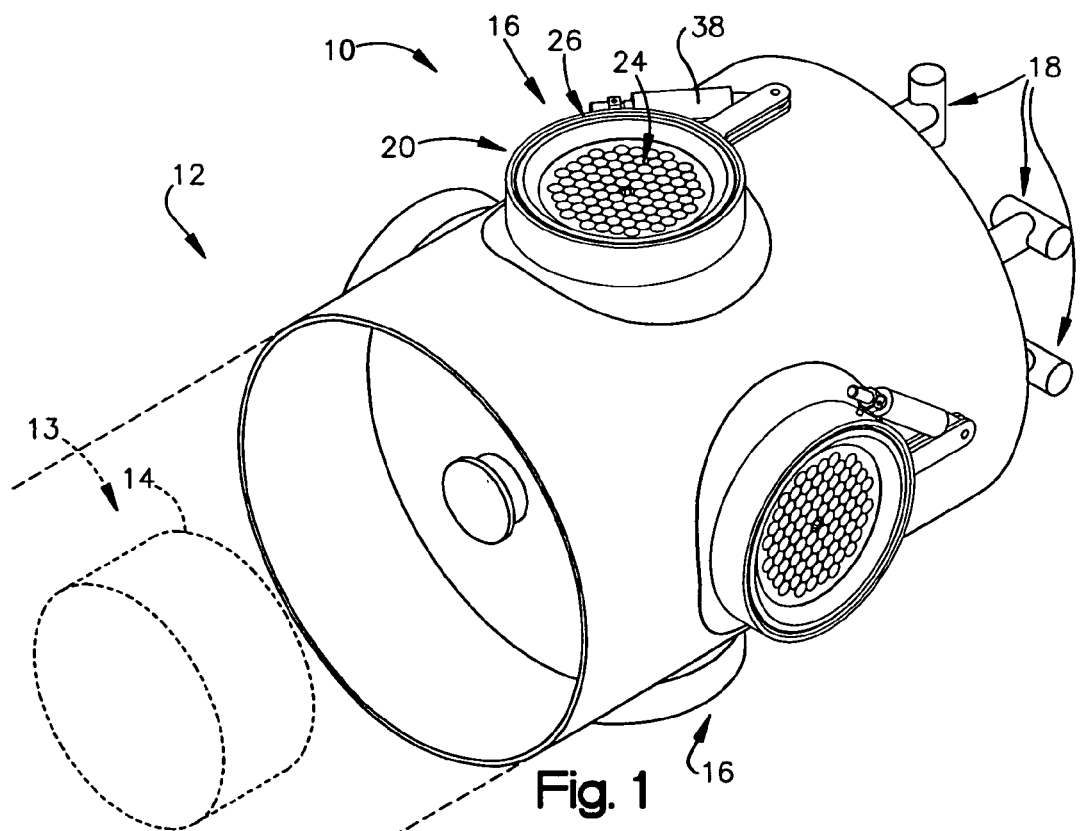
FIG. 1 is an oblique view of a missile in accordance with the present invention.
Figure 2:
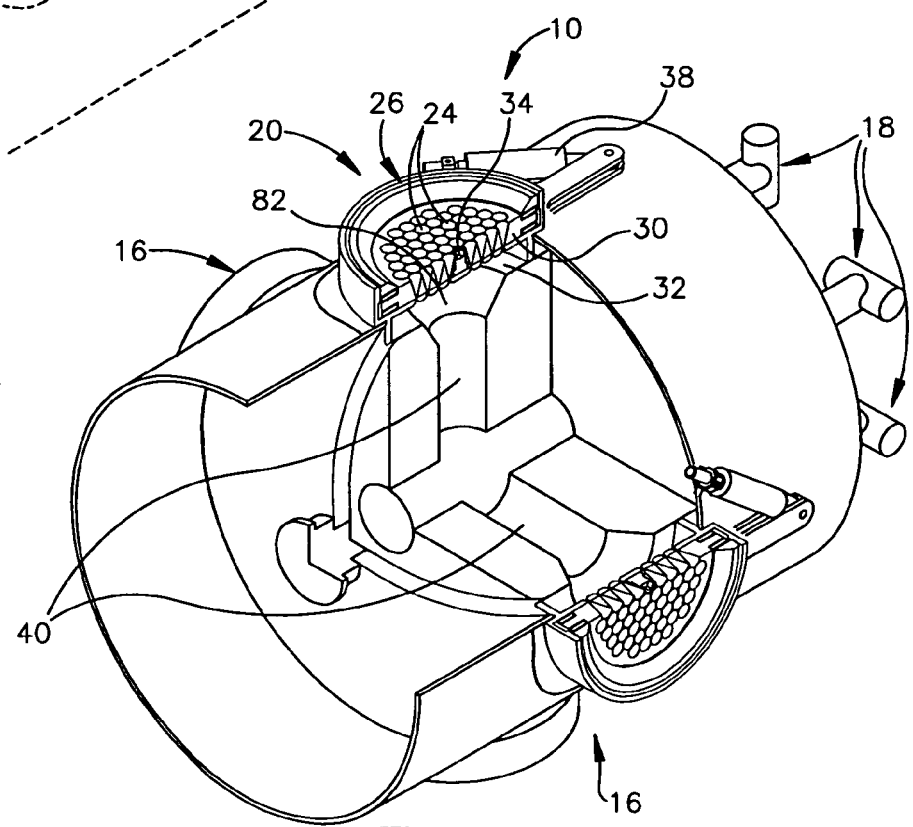
FIG. 2 is a partial cutaway view of the control system of FIG. 1.

FIGS. 1 and 2 show a control system 10 of a missile 12, for controlling thrust from a pressurized gas source 13, such as a solid fuel rocket engine 14. The control system 10 includes divert thrusters 16 and attitude control thrusters 18.

The divert thrusters each include a control valve 20 for controlling flow through a plurality of small nozzles (nozzlettes) 24 in a nozzle plate 26. The nozzle plate 26 may be substantially circular in shape. A moveable outer (divergent) section 30 of the nozzle plate 26 overlies and is rotatable relative to a fixed or stationary inner (convergent) section 32. The inner section 32 is upstream of the outer section 30. The sections 30 and 32 are coupled together at a central rotation axis by a bushing 34. A control valve actuator 38 is mechanically coupled to the outer section 30, in order to rotate the outer section 30 relative to the inner section 32, to control the amount of flow from the rocket engine 14, through the passages 40, and out through the nozzles 24.

Referring now in addition to FIGS. 3–6, further details are given of the control valve 20. The sections 30 and 32 each have respective openings 50 and 52. The openings 50 and 52, when aligned, form the convergent-divergent nozzles 24 to allow passage of pressurized gases through the control valve 20. As shown in the figures, the stationary or fixed inner section 32 has openings 52 that function as the convergent portions of the nozzles 24. The moveable outer section 30 has openings 50 that function as the throat and/or divergent portion of the nozzles 24. The relative rotation of the outer section 30, relative to the inner section 32, may be used to open, partially open, or close the nozzles 24. The sections 30 and 32 are retained within a housing 56 by a preload retainer ring 58. Needle bearings 60 are placed between the outer divergent section 30 and the inner divergent section 32, as well as between the outer divergent section 30 and the retainer ring 58. Suitable washers 62 are placed between the needle bearings 60 and the outer divergent section 30, inner convergent section 32, and retainer ring 58. The needle bearings 60 and the washers 62 allow for low-friction rotation of the divergent section 30 relative to the other parts of the control valve 20.

The control valve actuator 38 includes a motor 68 that turns a threaded shaft 70. A nut 72 that is threaded onto the shaft 70 moves up and down the shaft 70 as the motor 68 turns the shaft 70. The nut 72 has pins or trunnions 74, which engage corresponding holes 76 in a yoke 78. The engagement of the trunnions 74 with the holes 76 allows relative rotation between the yoke 78 and the nut 72. The yoke 78 is attached to the outer divergent section 30, passing through a slot 79 in the housing 56. The other end of the motor 68 (away from the nut 72) is coupled to an external surface of the missile 12. Thus, rotation of the shaft 70 by the motor 68 causes rotational movement of the divergent section 30 relative to the convergent section 32.

The control valve 20 provides several advantages over certain prior art divert thrusters. For one, the use of a nozzle plate 26 with multiple nozzles 24 allows a desired amount of thrust to be obtained with a more compact, lighter system, when compared with single-nozzle thrusters. In addition, all of the moving parts of the control valve 20 are outside the hot upstream pressurized combustion chamber 82 (FIG. 1). In particular, the actuator 38 and the moveable divergent section 30 are outside the pressurized combustion chamber 82. This facilitates the sealing of the pressurized combustion chamber 82, since all of the parts surrounding the pressurized combustion chamber 82 are fixed.

The nozzles 24 may have any of a variety of suitable sizes, and the nozzle plate 26 may have any of a variety of suitable numbers of nozzles, such as at least about 10 nozzles, or in an illustrated embodiment, 84 nozzles. Fewer nozzles, such as 6 nozzles or even 2 nozzles, may alternatively be used. The nozzle plate 26 may be made of any of a variety of suitable materials, such as glass- or graphite-reinforced phenolic materials. Multi-ply woven fabric inserts may be employed to strengthen the reinforced phenolic material. Ceramic inserts may be placed in the nozzles 24 to allow operation at higher temperatures and/or for longer periods of time, than are possible with use of plain phenolic materials. Suitable ceramic compounds may be enriched with carbon, zirconium, and/or aluminum oxide, in order to provide desired properties.

Figure 7:
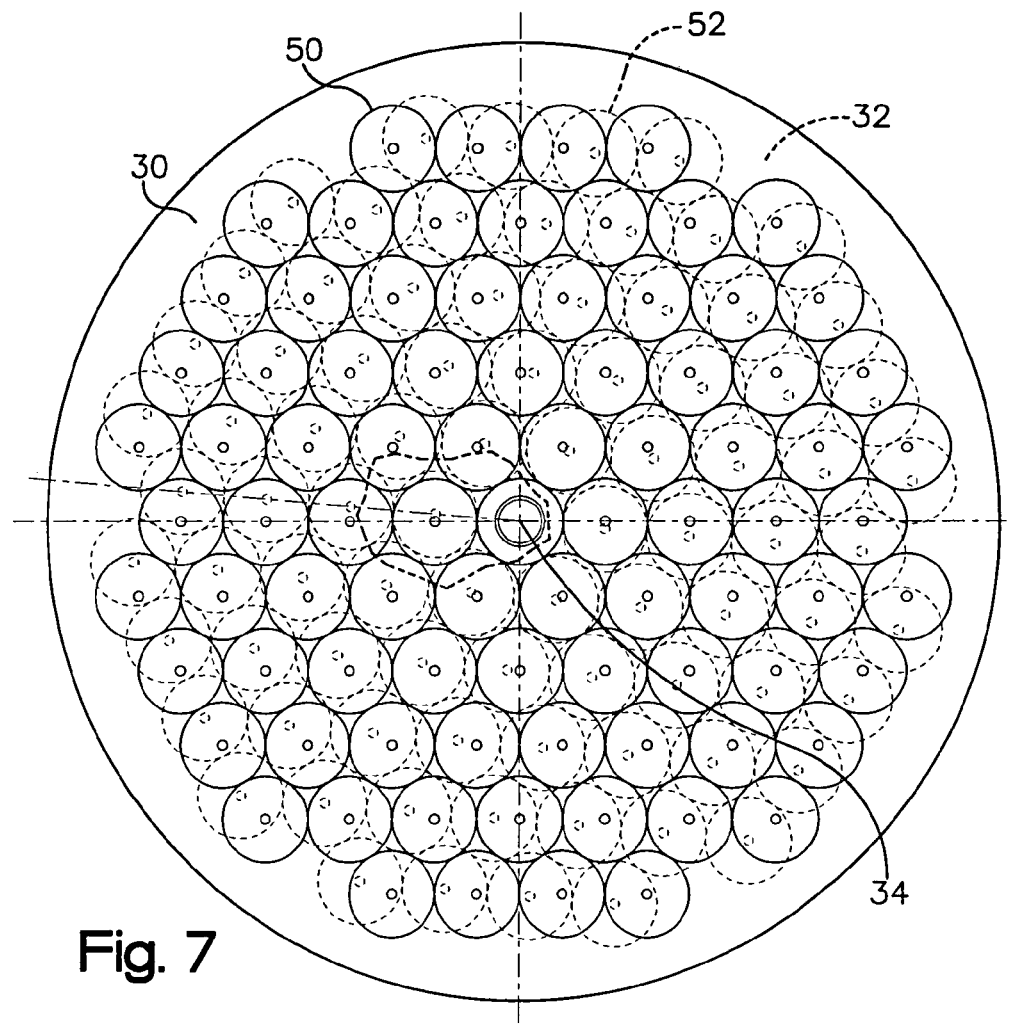
FIG. 7 is a top view illustrating the range of offset between the openings of the sections of the control valve.
Figure 8:
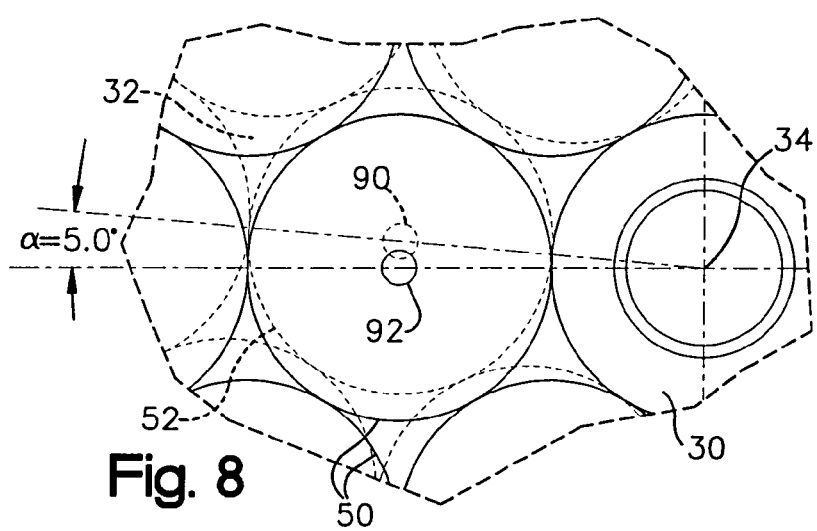
FIG. 8 is a magnified view of a portion of FIG. 7.

FIGS. 7 and 8 provide an illustration of the amount of rotation needed to offset the sections 30 and 32, and thereby prevent flow from passing through the control valve 20. The mating areas 90 and 92 of the respective openings 50 and 52 of the nozzle plate sections 30 and 32 may be small compared with the cross-sectional areas of other parts of the openings 50 and 52. The mating areas 90 and 92 may have cross-sectional areas that are less than about 10% of the area of the widest portion of the nozzle 24, and indeed may have cross-sectional areas less than about 1% of the broadest areas of the nozzle 24. Since the mating areas 90 and 92 may be relatively small, only a small angular deflection a of about 5 degrees or less is required to actuate the control valve 20 from fully open to fully closed. It will be appreciated that it may be the nozzles 24 that are closest to the rotational axis of the nozzle plate 26 that control how much rotation is needed to shift the control valve from being fully open to fully closed. As relative rotation between the sections 30 and 32 is used to close the nozzles 24, the nozzles 24 that are farthest from the rotation axis of the nozzle plate 26 close first, since their parts translate more for a given rotation than the nozzles 24 that are closest to the rotation axis of the nozzle plate 26.

The nozzles 24 described above have convergent and divergent portions. More broadly, the nozzles 24 may be openings that do not have a convergent-divergent shape. However, it is advantageous for openings in the control valve 20 to have a slender shape where the sections 30 and 32 come together, in order to reduce or minimize the amount of rotation necessary to move the valve 20 from fully closed to fully open.

Figure 3:
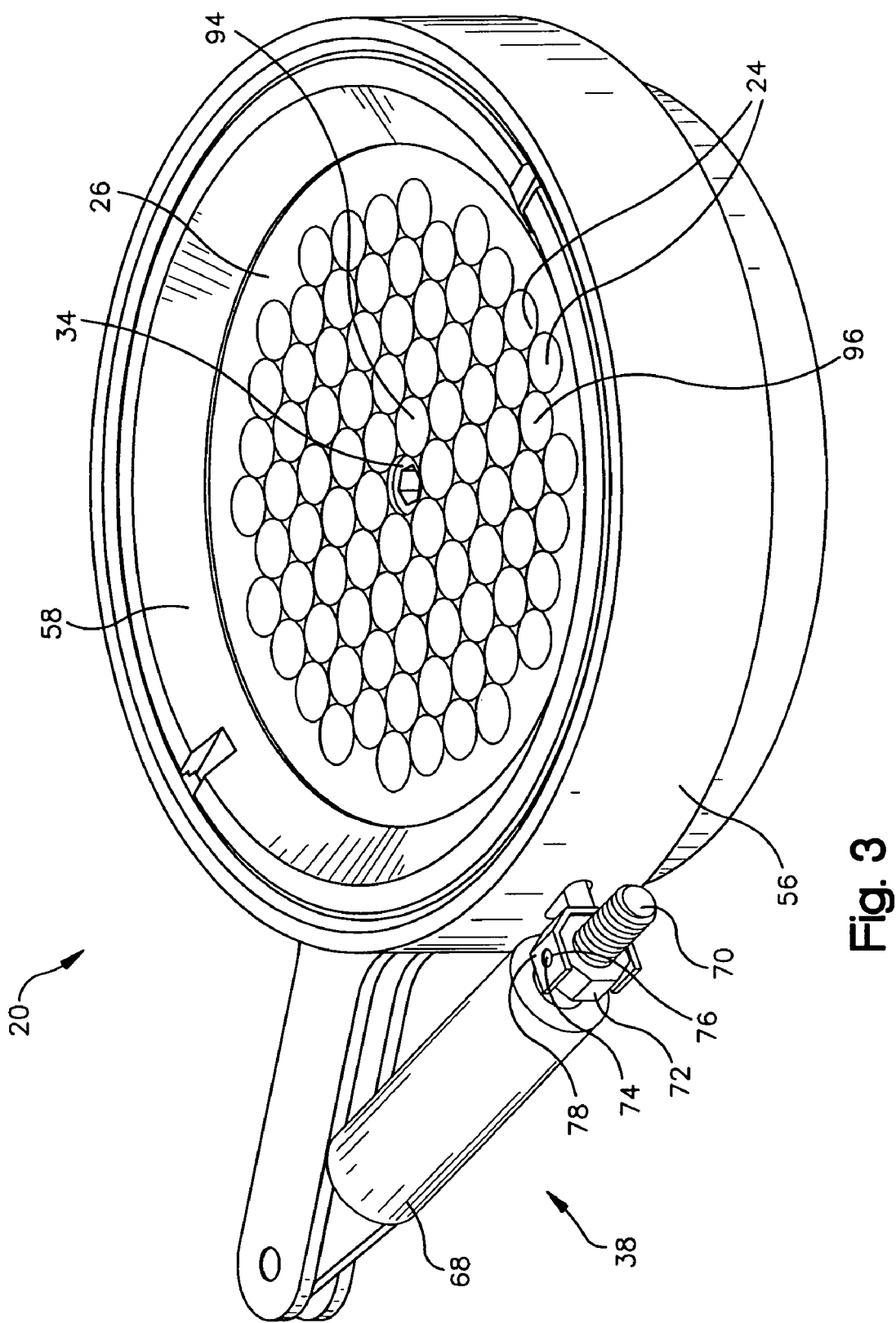
FIG. 3 is an oblique view of a control valve of the control system of FIG. 1.
Figure 4:
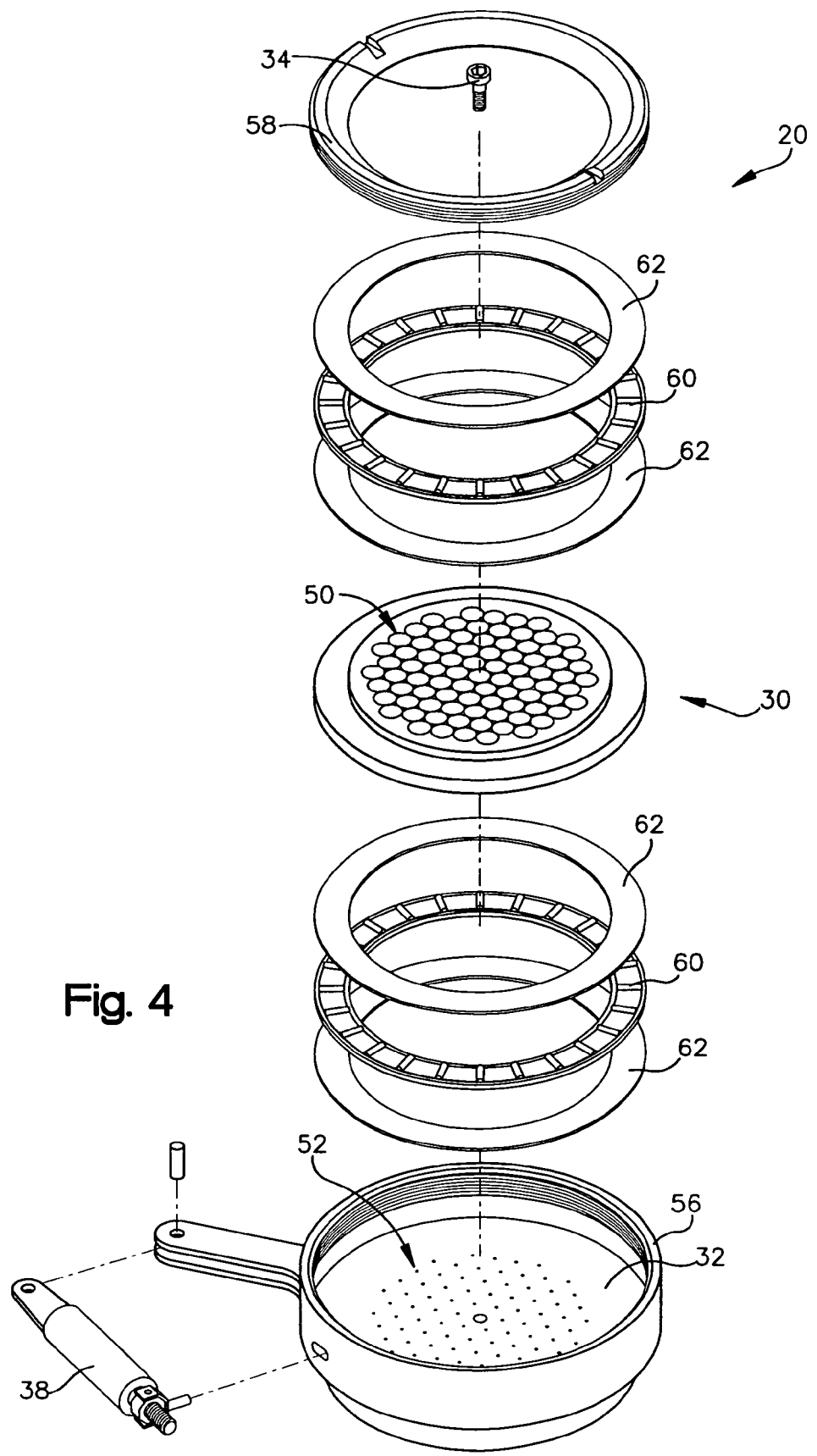
FIG. 4 is an exploded view showing components of the control valve of FIG. 3.
Figure 5:
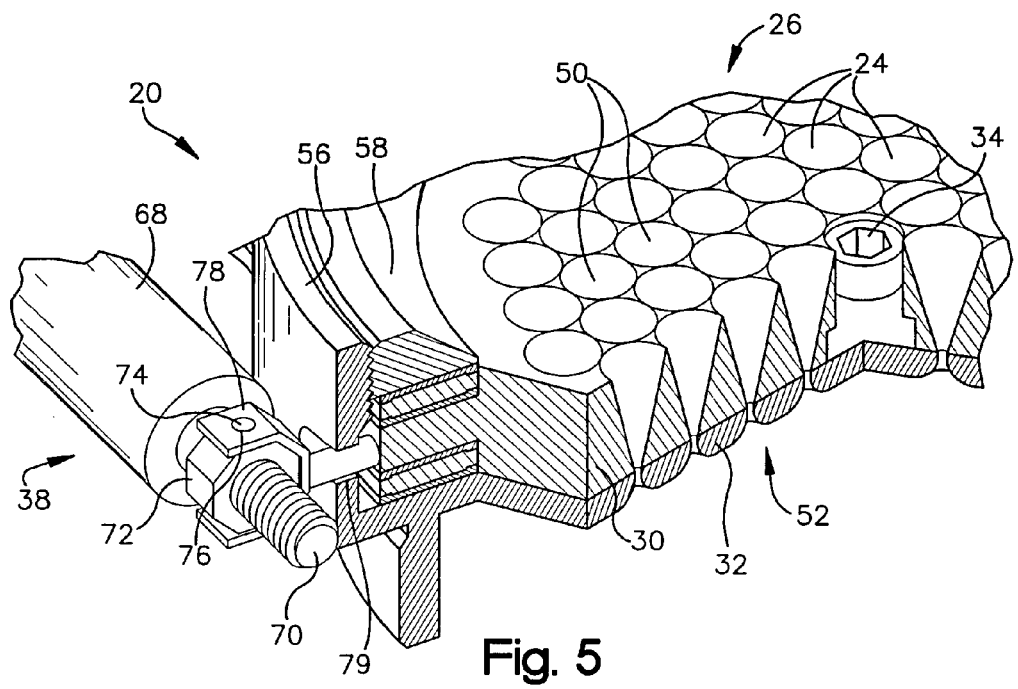
FIG. 5 is a partial cutaway view of the control system of FIG. 3.
Figure 6:
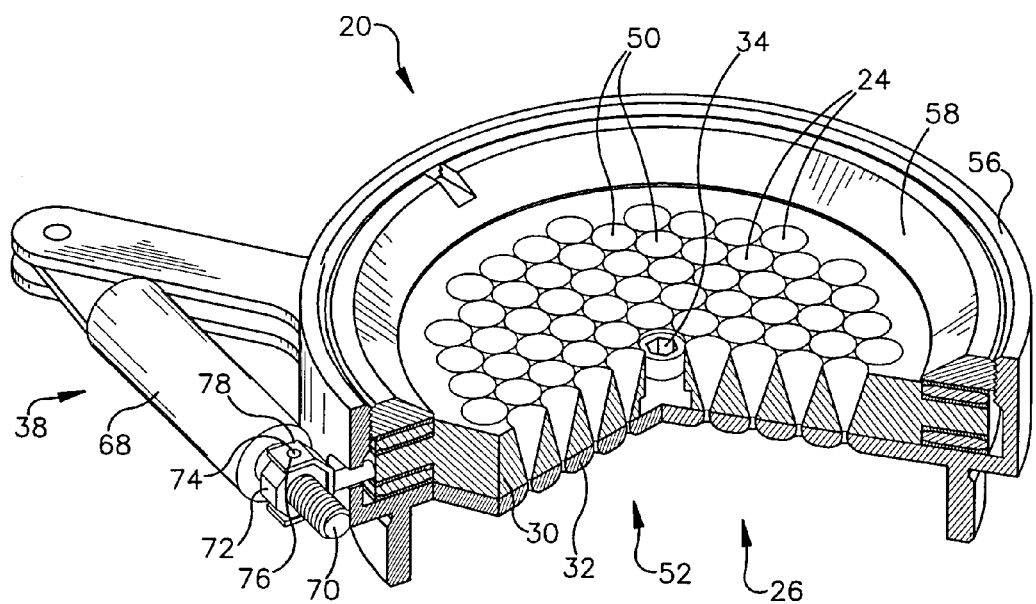
FIG. 6 is a cutaway view of a portion of the control system of FIG. 3.

In the illustrated embodiments, all of the nozzles 24 are substantially the same in size and shape. It will be appreciated that alternatively some of the nozzles may have different sizes and/or shapes than other of the nozzles. For example, the inner nozzles 94 (FIG. 3), closest to the rotation axis and the bushing 34, may have smaller throats and different shapes than more outboard nozzles 96 (FIG. 3).

By placing the control valve actuator 38 and associated parts outside the pressurized combustion chamber 82, the control valve actuator 38 is not subjected to the extremely hot environment that may be encountered within the pressurized combustion chamber 82.

Figure 9:
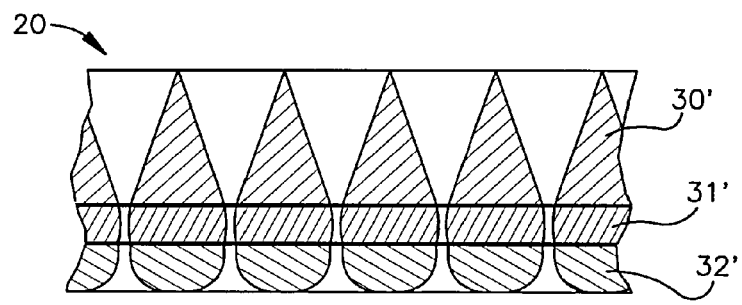
FIG. 9 is a sectional view showing an alternate embodiment control system in accordance with the present invention.

FIG. 9 illustrates an alternate embodiment, in which the control valve 20 has a moveable middle throat section 31' between fixed outer (divergent) and inner (convergent) sections 30' and 32'. It will be appreciated that other parts of the alternate embodiment may be similar to those of the embodiment of claims.

Figure 10:
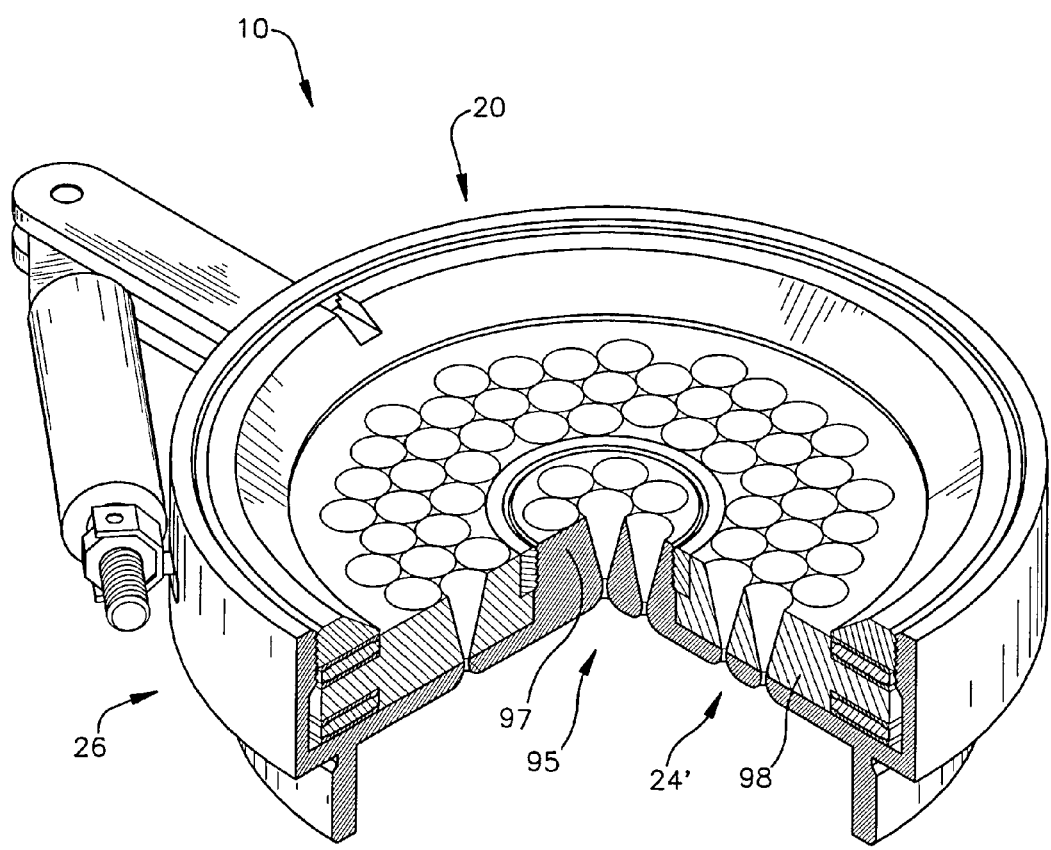
FIG. 10 is a partial cutaway view showing another alternate embodiment control system in accordance with the present invention.

FIG. 10 illustrates another alternate embodiment of the control system 10, in which the nozzle plate 26 of the control valve 20 has a plurality of actuatable nozzles 24', and one or more fixed nozzles 95 that are maintained open. The actuatable nozzles 24' may be selectively opened or closed by rotation of a portion of the nozzle plate 26, in a manner similar to that described above with regard to the nozzles 24. The fixed nozzles 95 are always maintained in an open configuration, a configuration that is unaffected by opening or closing of the actuatable nozzles 24'. The fixed nozzles 95 may be located in a central fixed plate section 97, surrounded by a peripheral plate section 98 that includes the actuatable nozzles 24'. A suitable bearing may be provided between the central fixed plate section 97 and the peripheral plate section 98, to allow relative rotation between the two, thus enabling selective opening and closing of the actuatable nozzles 24'.

It will be appreciated that the configuration shown in FIG. 10 may be employed in situations wherein it is required or desired that certain nozzles always remain open, with control desired for opening or closing of other of the nozzles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket engine control valve in combination with a pressurized gas source, the combination comprising:
   the rocket control valve, including:
      a fixed portion integrated to a pressure chamber and having fixed portion openings therein; and
      a movable portion having movable portion openings therein; and
   the pressurized gas source;
   wherein the movable portion overlies the fixed portion;
   wherein the movable portion is rotatably mounted to the fixed portion;
   wherein the fixed portion openings and the movable portion openings combine to produce plural nozzles each having a convergent section, a divergent section, and a throat;
   wherein the fixed portion openings and the movable portion openings line up, allowing flow therethrough, when the movable portion is in an open position relative to the fixed portion;
   wherein the fixed portion openings and the movable portion openings are offset from one another, preventing flow therethrough, when the movable portion is in a closed position relative to the fixed portion; and
   wherein the pressurized gas source is upstream of the control valve.

2. The combination of claim 1, wherein the fixed portion openings include the convergent sections; and
   wherein the movable portion openings include at least one of the divergent sections and the throats.

3. The combination of claim 1,
   wherein the fixed portion is a fixed substantially circular plate;
   wherein the movable portion is a movable substantially circular plate; and
   wherein the portions are coupled together at a central axis of the circular plates.

4. The combination of claim 3, further comprising an actuator mechanically coupled to the movable portion, for rotating the movable portion relative to the fixed portion.

5. The combination of claim 4,
   wherein the actuator includes:
      a motor,
      a threaded shaft; and
      a nut on the threaded shaft; and
   wherein the nut is fixedly coupled to the movable plate, such that rotation of the shaft causes movement of the movable plate.

6. A rocket engine control valve comprising:
   a fixed portion integrated to a pressure chamber and having fixed portion openings therein;
   a movable portion having movable portion openings therein; and
   an actuator mechanically coupled to the movable portion, for rotating the movable portion relative to the fixed portion;
   wherein the movable portion overlies the fixed portion;
   wherein the movable portion is rotatably mounted to the fixed portion;
   wherein the fixed portion openings and the movable portion openings combine to produce plural nozzles each having a convergent section, a divergent section, and a throat;
   wherein the fixed portion openings and the movable portion openings line up, allowing flow therethrough, when the movable portion is in an open position relative to the fixed portion;
   wherein the fixed portion openings and the movable portion openings are offset from one another, preventing flow therethrough, when the movable portion is in a closed position relative to the fixed portion;
   wherein the fixed portion is a fixed substantially circular plate;
   wherein the movable portion is a movable substantially circular plate;
   wherein the portions are coupled together at a central axis of the circular plates;
   wherein the actuator includes:
      a motor;
      a threaded shaft; and
      a nut on the threaded shaft;
   wherein the nut is fixedly coupled to the movable plate, such that rotation of the shaft causes movement of the movable plate; and
   wherein the nut has trunnions that engage holes in a yoke that is attached to the movable plate.

7. The combination of claim 4, wherein the actuator is external to a body that encloses a pressurized gas source in communication with the control valve.

8. The combination of claim 1, further comprising a needle bearing between the fixed portion and the movable portion.

9. The combination of claim 1, wherein the plural nozzles include at least ten nozzles.

10. The combination of claim 1, wherein the fixed plate is on an upstream side of the control valve, such that flow through the valve passes through the fixed portion openings before passing through the movable portion openings.

11. The combination of claim 10, wherein the pressurized gas source includes a solid propellant.

12. The combination of claim 10, as part of a missile.

13. The combination of claim 10, as part of a system of divert thrusters that also includes additional of the control valves, controlling thrust in different directions.

14. The combination of claim 13, as part of a control system that also includes attitude control thrusters.

15. A method of controlling thrust from a rocket engine, the method comprising:
   providing pressurized gas upstream of a control valve; and
   relatively configuring portions of the control valve, thereby selectively aligning or not aligning plural holes in each of the portions, to thereby allow or shut off flow through the control valve;
   wherein the holes, when aligned, form plural convergent-divergent nozzles.

16. The method of claim 15, wherein the portions include an upstream fixed portion that includes convergent holes.

17. The method of claim 15, wherein the portions include an upstream fixed portion, and a downstream movable portion.

18. The method of claim 17, wherein the relatively configuring includes rotating the movable portion relative to the fixed portion.

19. A rocket engine control valve comprising:
a fixed portion integrated to a pressure chamber and having fixed portion openings therein; and
a movable portion having movable portion openings therein;
wherein the movable portion overlies the fixed portion;
wherein the movable portion is rotatably mounted to the fixed portion;
wherein the fixed portion openings and the movable portion openings combine to produce plural nozzles each having a convergent section, a divergent section, and a throat;
wherein the fixed portion openings and the movable portion openings line up, allowing flow therethrough, when the movable portion is in an open position relative to the fixed portion;
wherein the fixed portion openings and the movable portion openings are offset from one another, preventing flow therethrough, when the movable portion is in a closed position relative to the fixed portion; and
wherein the control valve also includes one or more fixed nozzles that are maintained open.

20. A rocket engine control system comprising:
a pressurized gas source; and
thrusters downstream from the pressurized gas source and receiving flow from the gas source, for controlling thrust in different directions;
wherein each of the thrusters includes a control valve and an actuator coupled to the control valve for separately actuating the control valve;
wherein each of the control valves includes:
a fixed portion integrated to a pressure chamber and having fixed portion openings therein; and
a movable portion having movable portion openings therein;
wherein the movable portion overlies the fixed portion;
wherein the movable portion is rotatably mounted to the fixed portion;
wherein the fixed portion openings and the movable portion openings combine to produce plural nozzles each having a convergent section, a divergent section, and a throat;
wherein the fixed portion openings and the movable portion openings line up, allowing flow through both the fixed portion openings and the movable portion openings, when the movable portion is in an open position relative to the fixed portion; and
wherein the fixed portion openings and the movable portion openings are offset from one another, preventing flow through the fixed portion openings and preventing flow through the movable portion openings, when the movable portion is in a closed position relative to the fixed portion.

21. The control system of claim 20,
wherein the fixed portion is a fixed substantially circular plate;
wherein the movable portion is a movable substantially circular plate; and
wherein the portions are coupled together at a central axis of the circular plates.

22. The control system of claim 21,
wherein the actuator includes:
a motor;
a threaded shaft; and
a nut on the threaded shaft; and
wherein the nut is fixedly coupled to the movable plate, such that rotation of the shaft causes movement of the movable plate.

23. The control system of claim 20, wherein the fixed plate is on an upstream side of the control valve, such that flow through the valve passes through the fixed portion openings before passing through the movable portion openings.

24. The control system of claim 23, wherein the pressurized gas source includes a solid propellant.

25. The control system of claim 20, as part of a system of divert thrusters that also includes additional of the control valves, controlling thrust in different directions.

26. The control system of claim 20, wherein at least some of the control valves also include one or more fixed nozzles that are maintained open.

27. The method of claim 18, wherein the rotating includes, when shutting off flow through the control valve, shutting off flow first through nozzles that are farther from a central axis of the control valve.

28. A rocket engine control valve comprising:
a fixed portion in communication with a pressure chamber and having fixed portion openings therein; and
a movable portion having movable portion openings therein; and
wherein the movable portion overlies the fixed portion;
wherein the movable portion is rotatably mounted to the fixed portion at an axis of the portions;
wherein the fixed portion openings and the movable portion openings line up, allowing flow therethrough, when the movable portion is in an open position relative to the fixed portion;
wherein the fixed portion openings and the movable portion openings are offset from one another, preventing flow therethrough, when the movable portion is in a closed position relative to the fixed portion; and
wherein in moving from the open position to the closed position the fixed portion openings and the movable portion openings offset from one another to prevent flow therethrough first for openings farther from the axis, and later for openings closer to the axis.

29. The control valve of claim 28, wherein the fixed portion openings and the movable portion openings combine to produce plural nozzles each having a convergent section, a divergent section, and a throat.

* * * * *